US008988697B2

(12) United States Patent
Kai

(10) Patent No.: US 8,988,697 B2
(45) Date of Patent: Mar. 24, 2015

(54) DATA PROCESSING APPARATUS HAVING AN ABILITY TO DISPLAY A STATUS OF A PRINTING APPARATUS

(75) Inventor: Hiroshi Kai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1274 days.

(21) Appl. No.: 11/773,109

(22) Filed: Jul. 3, 2007

(65) Prior Publication Data

US 2008/0124093 A1 May 29, 2008

(30) Foreign Application Priority Data

Jul. 7, 2006 (JP) ................................ 2006-188695

(51) Int. Cl.
*G06K 15/00* (2006.01)
*G03G 15/00* (2006.01)

(52) U.S. Cl.
CPC .................................. *G03G 15/5087* (2013.01)
USPC ............... 358/1.14; 358/1.15; 399/8; 399/23; 399/81; 399/85

(58) Field of Classification Search
CPC .................................................. G06K 15/4045
USPC ............ 358/1.1, 1.14, 1.15, 1.13; 400/56, 74; 707/1; 399/8, 66, 371, 388, 394, 23, 399/38, 81; 705/11; 368/46, 107; 726/16
See application file for complete search history.

(56) References Cited

U.S. PATENT DOCUMENTS

| | | | | | |
|---|---|---|---|---|---|
| 5,511,150 | A | * | 4/1996 | Beaudet et al. | 358/1.14 |
| 5,579,447 | A | * | 11/1996 | Salgado | 358/1.15 |
| 5,878,302 | A | * | 3/1999 | Inui et al. | 399/81 |
| 6,048,115 | A | * | 4/2000 | Unishi et al. | 400/74 |
| 6,094,276 | A | * | 7/2000 | Yamaguchi et al. | 358/1.15 |
| 6,285,844 | B1 | * | 9/2001 | Kuga | 399/85 |
| 6,419,409 | B1 | * | 7/2002 | Ueda et al. | 400/56 |
| 6,744,527 | B1 | * | 6/2004 | Dorsey et al. | 358/1.14 |
| 2002/0048035 | A1 | * | 4/2002 | Beaudet et al. | 358/1.14 |
| 2003/0046268 | A1 | * | 3/2003 | Hirabayashi | 707/1 |
| 2003/0112457 | A1 | * | 6/2003 | Akiyama et al. | 358/1.14 |
| 2003/0142353 | A1 | * | 7/2003 | Allen et al. | 358/1.16 |
| 2003/0170039 | A1 | * | 9/2003 | Taguchi et al. | 399/66 |
| 2003/0175041 | A1 | * | 9/2003 | Taguchi et al. | 399/66 |
| 2004/0028437 | A1 | * | 2/2004 | Yoshizuka | 399/388 |
| 2004/0136736 | A1 | * | 7/2004 | Inaba | 399/38 |
| 2004/0145973 | A1 | * | 7/2004 | Nagashima | 368/107 |
| 2004/0168116 | A1 | * | 8/2004 | Shikata | 358/1.1 |
| 2004/0228639 | A1 | * | 11/2004 | Badovinac et al. | 399/8 |

(Continued)

FOREIGN PATENT DOCUMENTS

| | | |
|---|---|---|
| JP | 2000-177218 | 6/2000 |

*Primary Examiner* — Nicholas Pachol

(74) *Attorney, Agent, or Firm* — Cowan, Liebowitz & Latman, P.C.

(57) ABSTRACT

A data processing apparatus, connected to a printing apparatus, that transfers print data to the printing apparatus and performs a status display of the printing apparatus, the data processing apparatus comprising: a first determination unit adapted to determine a processing status of the print data; a second determination unit adapted to determine the presence/absence of a warning status based on a status notified from the print apparatus; and a message display unit adapted to display a warning based on the determination made by the second determination unit, in accordance with the processing status of the print data as determined by the first determination unit.

14 Claims, 10 Drawing Sheets

(56) References Cited

U.S. PATENT DOCUMENTS

| | | | | |
|---|---|---|---|---|
| 2005/0008382 | A1* | 1/2005 | Taguchi et al. | 399/66 |
| 2005/0018236 | A1* | 1/2005 | Shirai et al. | 358/1.14 |
| 2005/0052659 | A1* | 3/2005 | Jacobsen et al. | 358/1.1 |
| 2005/0111894 | A1* | 5/2005 | Hosoi | 399/371 |
| 2005/0141938 | A1* | 6/2005 | Yoshizuka | 399/394 |
| 2005/0183141 | A1* | 8/2005 | Sawada | 726/16 |
| 2005/0267797 | A1* | 12/2005 | Takahashi et al. | 705/11 |
| 2005/0270563 | A1* | 12/2005 | Kamata et al. | 358/1.15 |
| 2006/0002752 | A1* | 1/2006 | Ebuchi | 400/76 |
| 2006/0039707 | A1* | 2/2006 | Mima | 399/23 |
| 2006/0056872 | A1* | 3/2006 | Hosoi | 399/81 |
| 2006/0103866 | A1* | 5/2006 | Saka et al. | 358/1.13 |
| 2006/0126115 | A1* | 6/2006 | Morikawa et al. | 358/1.15 |
| 2006/0164674 | A1* | 7/2006 | Someno | 358/1.14 |
| 2006/0232812 | A1* | 10/2006 | Shimizu | 358/1.14 |
| 2006/0256353 | A1* | 11/2006 | Noda et al. | 358/1.1 |
| 2007/0019225 | A1* | 1/2007 | Digby | 358/1.14 |
| 2007/0177185 | A1* | 8/2007 | Ogura et al. | 358/1.14 |
| 2007/0182988 | A1* | 8/2007 | Maeda | 358/1.15 |
| 2007/0229879 | A1* | 10/2007 | Harmon et al. | 358/1.15 |
| 2007/0229880 | A1* | 10/2007 | Harmon et al. | 358/1.15 |
| 2010/0131954 | A1* | 5/2010 | Nagashima | 368/46 |

* cited by examiner

DATA PROCESSING APPARATUS HAVING AN ABILITY TO DISPLAY A STATUS OF A PRINTING APPARATUS

BACKGROUND OF THE INVENTION

1. Field of the Invention

The present invention relates to a data processing apparatus that displays a status of a printing apparatus, and a control method of the data processing apparatus.

2. Description of the Related Art

A conventional printing system is generally configured of a printer capable of image output, a host computer that controls the printer and generates print data, and a communications interface that connects the printer and the host computer to one another. In a printer, various malfunctions occur. Malfunctions occurring during print processing are classified as "error status" or "warning status" depending on whether or not the print processing can be continued.

In the case where an error status has occurred, in general, the print processing of the printer is stopped, and printing cannot be continued unless the error status is resolved. In the case where a warning status has occurred, printing can generally be continued under the warning status, even if the warning status is not resolved. In the case where an error status, warning status, or the like occurs in a printer, the host computer connected to the printer generally displays the error or warning occurrence, along with a procedure for resolving the error or warning status, on a screen.

The case where the type, size, and the like of the paper set in the printer and the settings of the print data do not match can be given as an example of a warning status. In such a case, the host computer displays a warning window, and an operation selected from among stopping printing, continuing printing, or changing settings is performed (for example, see Japanese Patent Laid-Open No. 2000-177218).

A mismatch between the paper of the paper feed tray selected by the printer and the paper of the paper feed tray set in the document can be given as a further example of a warning status. In general, it is possible to perform settings for specifying the paper feed tray of the printer to be used, or specifying that the paper feed tray selected by the printer is to be used, through the host computer. These settings are performed by a user via a user interface (UI) provided by the printer driver. In particular, the setting for specifying that the paper feed tray selected by the printer is to be used does not require settings to be changed by the printer driver in order to change the paper feed tray, and is therefore convenient; thus, this setting is often used. With this setting, printing is normally performed onto paper supplied from the paper feed tray selected by the printer, in the case where printing is performed from a single client computer.

However, there are also cases where the paper feed tray is specified by an application, and in such cases, the paper feed tray is used in accordance with specification information of the paper feed tray saved in the document. For example, with Microsoft Corporation's word processing program "MS Word", the paper feed tray used for outputting a document file being edited can be specified in the "page setup" menu so that different paper feed trays are used for the first page and for the second and subsequent pages. When a document that includes such paper feed tray settings is printed, the printing is performed in accordance with the paper feed tray settings included in the document.

The specified paper feed tray (including a paper feed tray specified in accordance with selection made by the printer) is denoted in the print settings included in the print job for printing the document and is passed to the printer, in both the case of specification being performed by the printer driver and the case of specification being performed by the application.

As a result, cases can arise in which the paper feed tray selected by the printer and the paper feed tray specified in the print job are different. For this reason, there are cases where the document is printed onto paper of a paper feed tray not originally intended by the user. In such a case, problems such as paper being wasted, paper running out during printing, and the like occur. Accordingly, there is a printing system that carries out a warning display in the case where the state of a paper feed tray selection switch on the printer does not match with the paper feed tray specified in the print job.

However, the abovementioned conventional technology has the following problems. A warning window is displayed every time a warning status, paper feed tray mismatch, or the like occurs, and therefore the warning window is displayed unconditionally even in the case where, for example, the warning status occurs while printing the final page of the document data to be printed. Normally, in such a case, a user will not stop the printing, remove the warning status, and redo the printing, and thus the display of the warning window is useless.

Furthermore, in cases such as where many pages of the document data remain to be printed, a large amount of time remains until the printing finishes, and so on, even if a warning status occurs, the warning display is useless in the case where the user is not authorized to stop printing, perform printer operations, and the like. The reason for this is that the only choice the user has is to continue printing. Conventionally, warning windows have been displayed even in cases such as these.

Conversely, if the user is inexperienced with computers, he or she may blindly follow a warning displayed in the state mentioned above, and redo the printing entirely. In a case such as this, the warning display is not only useless, but is also harmful, as the warning display leads to the consumption of resources and a decrease in productivity caused by redoing the printing.

SUMMARY OF THE INVENTION

The present invention has been conceived in order to solve the aforementioned problems. The present invention provides a data processing apparatus that, by displaying a warning of a printing apparatus in accordance with the processing status of the printing, does not display useless warnings, as well as a control method for the data processing apparatus. Through this, it is possible to reduce the amount of work required as a result of user interaction and to cut back on the amount of resources consumed.

The data processing apparatus of the present invention has the following configuration. In other words, according to a first aspect of the invention, the data processing apparatus is connected to a printing apparatus, transfers print data to the printing apparatus, and performs a status display of the printing apparatus, and comprises: a first determination unit adapted to determine a processing status of the print data; a second determination unit adapted to determine the presence/absence of a warning status based on a status notified from the print apparatus; and a message display unit adapted to display a warning based on the determination made by the second determination unit, in accordance with the processing status of the print data as determined by the first determination unit.

According to the present invention, by displaying a warning of a printing apparatus in accordance with the processing status of printing, useless warning displays are not performed; accordingly, it is possible to reduce the amount of work required as a result of user interaction and to cut back on the amount of resources consumed.

Further features of the present invention will become apparent from the following description of exemplary embodiments with reference to the attached drawings.

DESCRIPTION OF THE EMBODIMENTS

Hereinafter, an embodiment of the present invention shall be described in detail with reference to FIGS. 1 through 10. Note that “USB” as used in the following descriptions is an abbreviation of “Universal Serial Bus”, and as this is a publicly-known two-way communication interface, detailed descriptions thereof shall be omitted.

Figure 1:
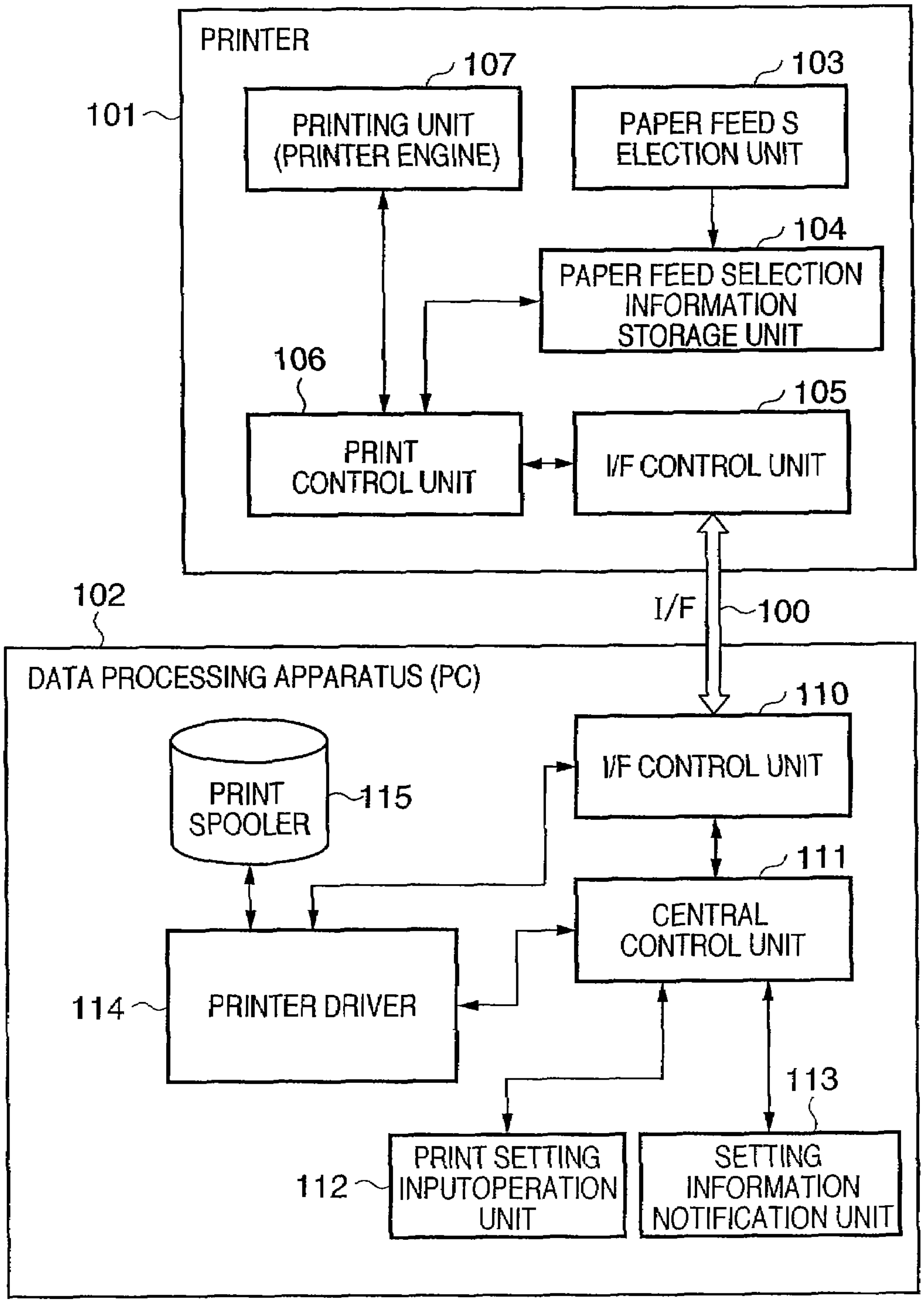
FIG. 1 is a block diagram showing a configuration of a printing system in which a data processing apparatus of the first embodiment of the present invention can be applied.

FIG. 1 is a block diagram showing a configuration of a printing system in which a data processing apparatus of the first embodiment of the present invention can be applied. In FIG. 1, a printer 101 is a color ink-jet printer that forms an image, and forms the image based on print data generated by a personal computer (PC) 102, which shall be described later. It should be noted that while the printer type has thus far been described as a color ink-jet printer, the present embodiment places no particular limitation on the type of printer used.

The printer 101 is configured of functional blocks 103-107. In the present embodiment, one of an auto sheet feeder and a cassette can be selected via a paper feed selection unit 103 of the printer 101. In the case where the print job setting is set so that the paper feed tray selected by the printer is to be used, the paper feed tray selected by the paper feed selection unit 103 is used.

A paper feed selection information storage unit 104 is a storage unit that stores the type of the paper feed tray selected by the paper feed selection unit 103. In the case where paper feed tray information specified in the print data transferred from the PC 102 indicates that the paper is to be supplied in accordance with the paper feed selection unit 103, the paper feed tray information is referred to by a print control unit 106, which shall be described later; paper is supplied from the paper feed tray stored in the paper feed tray information, and printing is performed. Note that in the present embodiment, no distinction is made between “print job” and “print data”; both may be referred to herein as “print data”.

An I/F control unit 105 controls the interface functions of the printer 101. Because the interface assumed here is USB, the I/F control unit 105 is configured to be a controller for a USB peripheral device. The I/F control unit 105 sends status information of errors, warnings, and the like occurring in the printer 101 itself, the processing status of the print data, information of the type of the paper feed tray selected by the paper feed selection unit 103, and so on, and receives print data and control commands.

A print control unit 106 receives print data sent from the PC 102 and expands the data into a format that can be output by a printer engine. The print data sent from the PC 102 is data on which image processing, based on print settings that include the type of paper, size of paper, and the like, has already been performed in the PC 102; the print control unit 106 controls the printer engine in accordance with print control commands included in the print data. To be more specific, the data used is configured of various commands that control binary data for printing (in some cases, intermediate data prior to binarization), the amount of ink output, the number of passes, the direction of printing, and the amount of paper conveyed.

Figure 5A:
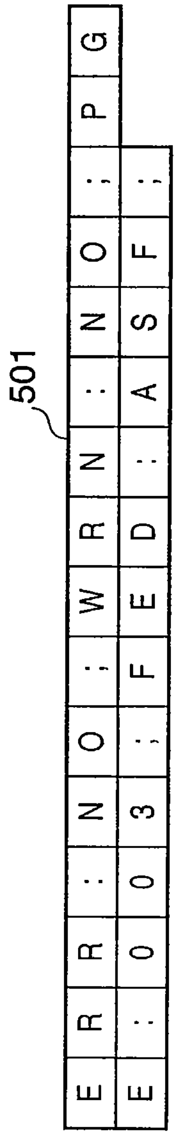
FIGS. 5A and 5B are schematic views illustrating a data format of status information notified to the printer driver from the printer shown in FIG. 1.
Figure 5B:
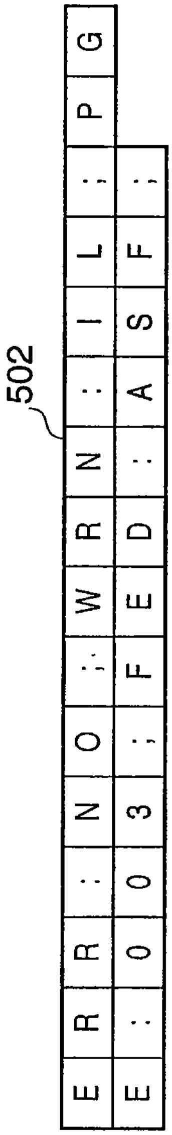

Furthermore, the print control unit 106 sends status information, as shown in FIGS. 5A and 5B, to the PC 102. The status information is issued, for example, periodically, per page as printing progresses, or each time an error, warning, or the like occurs.

A printing unit (printer engine) 107 prints the print data expanded by the print control unit 106 onto a recording medium (paper). Here, because the printer 101 is an ink-jet printer, the image is formed through a discharge of ink. In addition, the printing unit 107 includes two paper feeding means, the paper feeding means being an auto sheet feeder and a cassette, and prints onto paper supplied from these paper feed means.

A data processing apparatus 102 generates print data and controls the printer 101 connected thereto. Here, a personal computer (referred to as a “PC” hereafter) is used as the data processing apparatus. The data processing apparatus also functions to accept instructions and input regarding printing from a user.

The PC 102 is configured of functional blocks 110-115. While not illustrated in FIG. 1, an operating system that controls the PC 102 is provided in the PC 102, and the functional blocks operate in this operating system. A communication interface 100 connects the PC 102 with the printer 101. Here, USB, which is a serial interface, is used; however, IEEE 1394, Ethernet™, IrDA, IEEE 802.11, an electrical line, or the like may be used instead. A number of types of parallel interface, such as Centronics, SCSI, or the like may also be used. Ultimately, any wired/wireless interface may be used as long as it is an interface that implements two-way communication. Thus, the printing system of the present embodiment is not a single unit; rather, the printing system has a configuration in which the PC 102 and the printer 101 that forms images are connected by a specific two-way interface. However, the present invention is not limited to this example, and the printing system may be an integrated apparatus in which the PC and printer are combined. Note that functions of the printer 101 and PC 102 not considered of particular necessity in the descriptions of the present embodiment shall be omitted.

An I/F control unit 110 controls the interface functions of the PC 102. The I/F control unit 110 is configured of a controller on the USB host side, and functions as a USB host. Part of the USB host functionality is also implemented by software, such as the OS, a driver, and so on.

A printer driver 114 is software for performing various settings for printing, generation of print data, and printer control in the PC 102. Details of the printer driver 114 shall be given later with reference to FIG. 2.

A print spooler 115 sequentially stores print data generated by a print data generation processing unit 116, which shall be described later, and transfers the stored print data to the printer 101. Because the storage and transferal of the print data are not performed synchronously, the print data generation processing does not wait for the printing processing of the printer 101 even in the case where the print data generation processing is performed faster than the printing processing of the printer 101, and thus processing is performed efficiently. In general, the print spooler 115 is provided as a function of the operating system of the computer.

A central control unit 111 controls various functions of the PC 102; the functionality of a CPU corresponds to this control. A print setting input operation unit 112 is configured of various input instruments for causing the user's intent to be reflected in the print setting. A setting information notification unit 113 notifies the user of status information of the printer, help information, and the like. Using a display device such as a monitor or performing an audio notification are examples of notification methods.

<Configuration of the Printer Driver>

Figure 2:
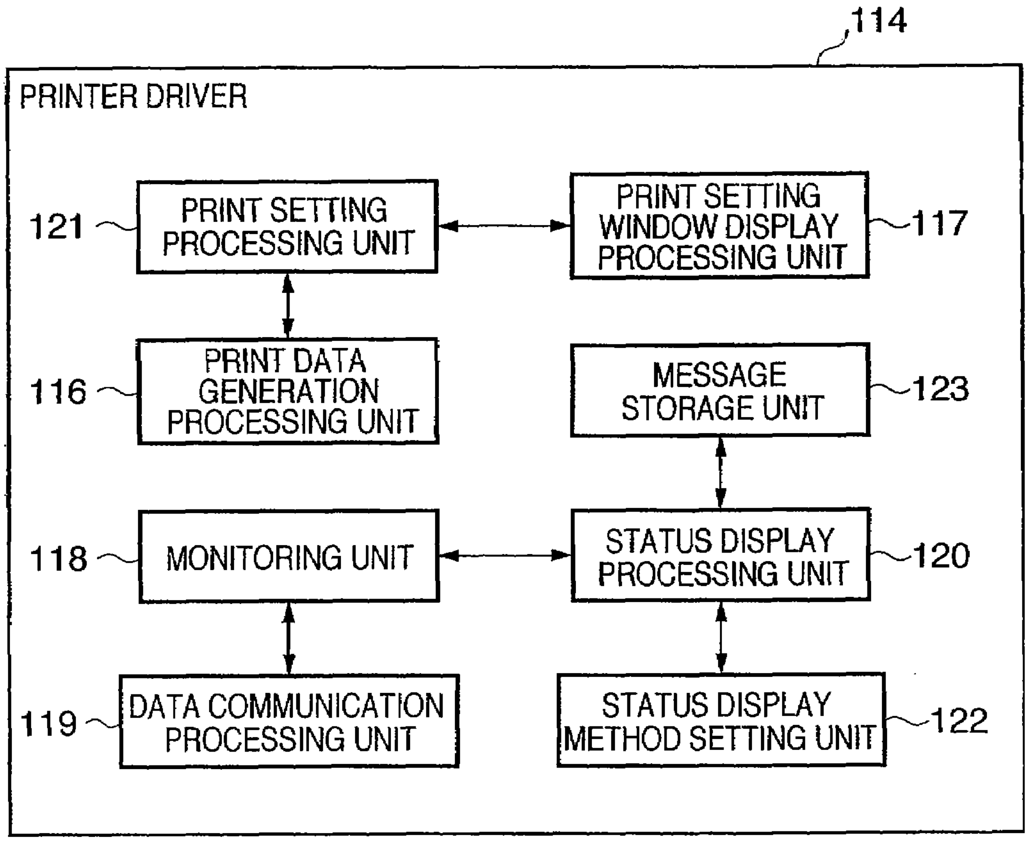
FIG. 2 is a block diagram showing an internal configuration of the printer driver shown in FIG. 1.

FIG. 2 is a block diagram showing an internal configuration of the printer driver 114 shown in FIG. 1. A print setting processing unit 121 shown in FIG. 2 performs various print settings, including paper settings, print quality settings, and so on in accordance with instructions, input, or the like from the user. The print setting processing unit 121 has a function for displaying or notifying the details of the instructions upon accepting the instruction, input, or the like from the user.

The print data generation processing unit 116 creates a print job, generates print data in accordance with the various settings performed by the print setting processing unit 121, and spools the print data into the print spooler 115.

A monitoring unit 118 sequentially transfers the print data stored in the print spooler 115 from a data communication processing unit 119, described later, to the printer 101 via the I/F control unit 110, based on an instruction from the print spooler 115.

When the monitoring unit 118 transfers the print data to the printer, receives a request from a status display processing unit 120, described later, or the like, the monitoring unit 118 acquires status information such as an error or a warning of the printer 101 through two-way communication with the printer 101. The status display processing unit 120 displays the status information in a display based on the acquired information. Note that in a computer, a program generally performs input/output using a function provided by the operation system, and therefore no particular descriptions regarding the use of functions provided by the operating system shall be given in the present specification.

A data communication processing unit 119 performs processing for communicating with the printer 101 via the I/F control unit 110 in accordance with instructions from the monitoring unit 118. The processing for communication performed with the printer 101 is bidirectional, and the data communication processing unit 119 performs processing for transferring the print data and the like to the printer 101. In addition, the data communication processing unit 119 performs processing for acquiring status information of the printer from the printer 101, the status information being information of an error or a warning occurring in the printer, information of the type of paper feed tray selected by the paper feed selection unit 103, and the like.

The status display processing unit 120 displays an error message, a warning message, and the like based on the status information acquired by the monitoring unit 118 from the printer.

A print setting window display processing unit 117 displays a print setting window for performing various settings regarding printing, and can accept an input from the user and perform settings.

A status display method setting unit 122 can perform settings regarding the display method of the status display processing unit 120. The status display method setting unit 122 can, when the status display processing unit 120 performs a warning display, set whether or not to switch the display in accordance with the usefulness of the warning display, and can set the details of how the switch is made. Details of the status display method setting unit 122 shall be given later with reference to FIG. 7.

A message storage unit 123 stores a bitmap image and character string resource displayed in the warning window (a message) in association with the type of warning status to be displayed.

<Printing Processing>

Figure 3:
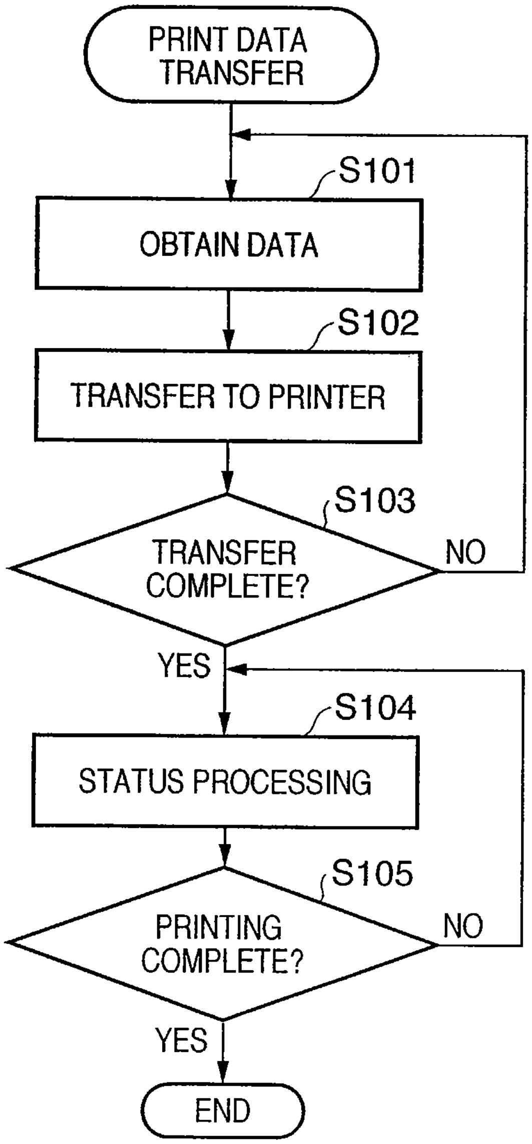
FIG. 3 is a flowchart illustrating an operation of data transfer processing performed by a monitoring unit of the printer driver shown in FIG. 2.

FIG. 3 is a flowchart illustrating an operation of print data transfer processing performed by the printer driver 114. Details of print data transfer processing shall be given later.

Figure 4:
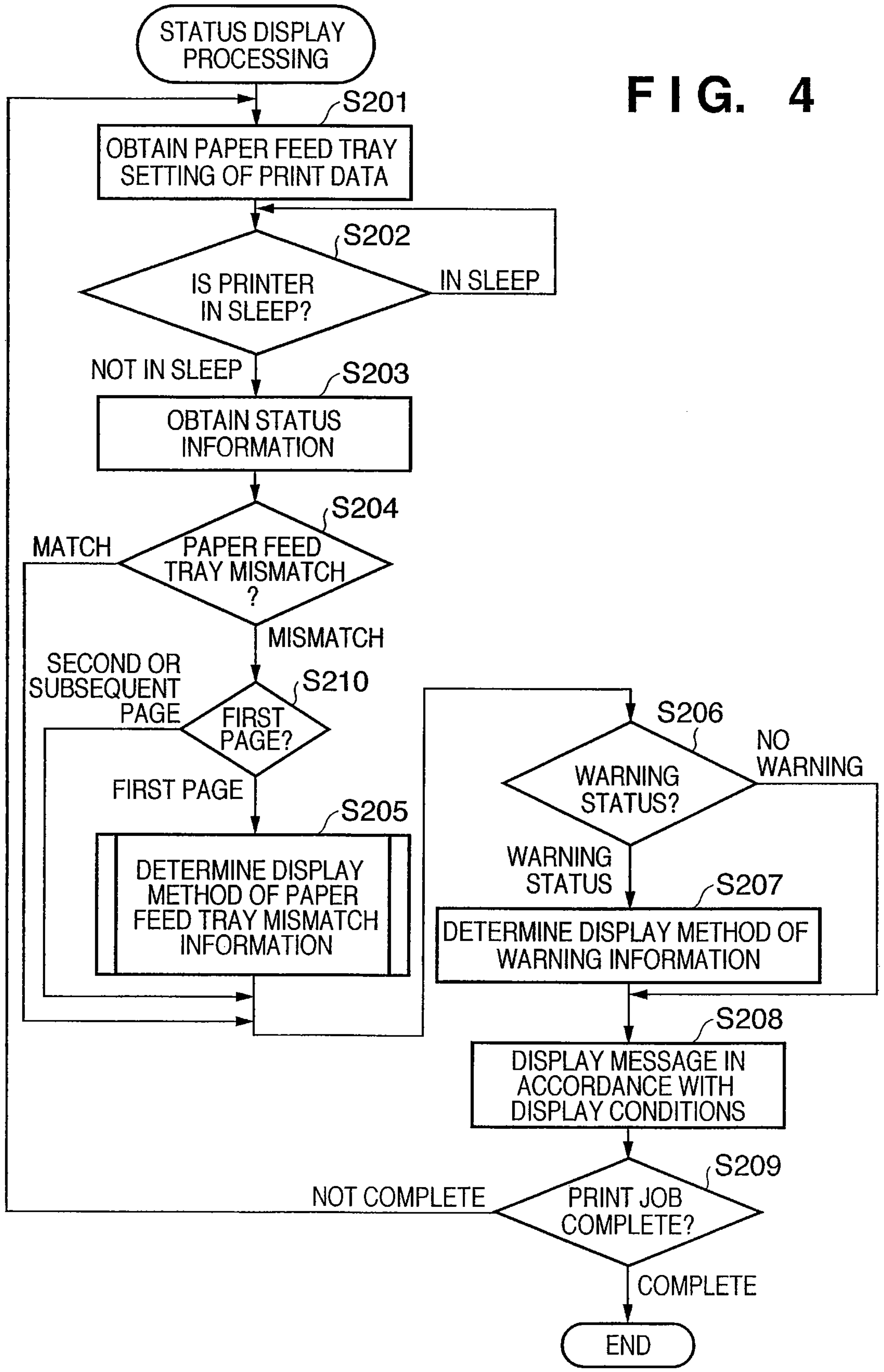
FIG. 4 is a flowchart illustrating an operation of status display processing performed by a status display processing unit of the printer driver shown in FIG. 2.

FIG. 4 is a flowchart illustrating a processing operation of the status display processing unit 120 of the printer driver 114. Details of the status display processing shall be given later.

FIGS. 5A and 5B are schematic views illustrating an example of the data format of the status information communicated to the data processing apparatus 102 by the printer 101. In FIGS. 5A and 5B, each frame included in status information 501 and 502 indicates 1-byte data. The first 4 bytes ("ERR:") are a data item name indicating error information; the next 2 bytes ("NO") are a code indicating that an error has not occurred; and the next 1 byte (";") is a terminal symbol of the data item. In the present embodiment, there are the following error codes: "PO" (out of-paper error); "IO" (out-of-ink error); and "NO" (no error). The next 4 bytes ("WRN:") are a data item name indicating warning information. The next 2 bytes ("NO") are a code indicating that a warning has not occurred; and the next 1 byte (";") is a terminal symbol of the data item. In the present embodiment, there are the following warning codes: "IL" (ink low warning); and "NO" (no warning). The following 4 bytes ("PGE:") are a data item name indicating information of the page currently undergoing printing processing (for example, a page number). The "page number" referred to here is a number physically indicating one side of the paper. For example, in the case where two logical pages in the application data are laid out on one side of a physical piece of paper, a single page number specifies two logical pages. The next 3 bytes ("003") is a code indicating that the page currently undergoing printing processing is the third page of the print data that makes up a single print job, and the following 1 byte (";") is a terminal symbol of the data item. In the present embodiment, the page code ranges from "000" to "999". "000" indicates that printing processing has not yet started or that printing processing has finished. "001" to "999" express what number page in the print data that makes up a single print job the currently-printing page is, through a decimal. Through this page code, the host can determine the state of processing, or in other words, how much the print output processing of the print data has progressed. The following 4 bytes ("FED:") are a data item name indicating information of the paper feed tray selected by the paper feed tray selection switch of the printer 101. The next 3 bytes ("ASF") are a code indicating that the auto sheet feeder is selected by the paper feed tray selection switch, and the next 1 byte (";") is a terminal symbol of the data item. In the present embodiment, "ASF" or "CAS" exist as codes of the paper feed tray selection switch. "ASF" indicates the auto sheet feeder, while "CAS" indicates the cassette. The example of the status information 501 indicates that the third page is being printed, no errors or warnings have occurred, and the paper feed tray selection switch of the printer selects the auto sheet feeder. On the other hand, the example of the status information 502 indicates that the third page is being printed, an error has not occurred but an ink low warning has occurred, and the paper feed tray selection switch of the printer selects the auto sheet feeder.

Figure 6:
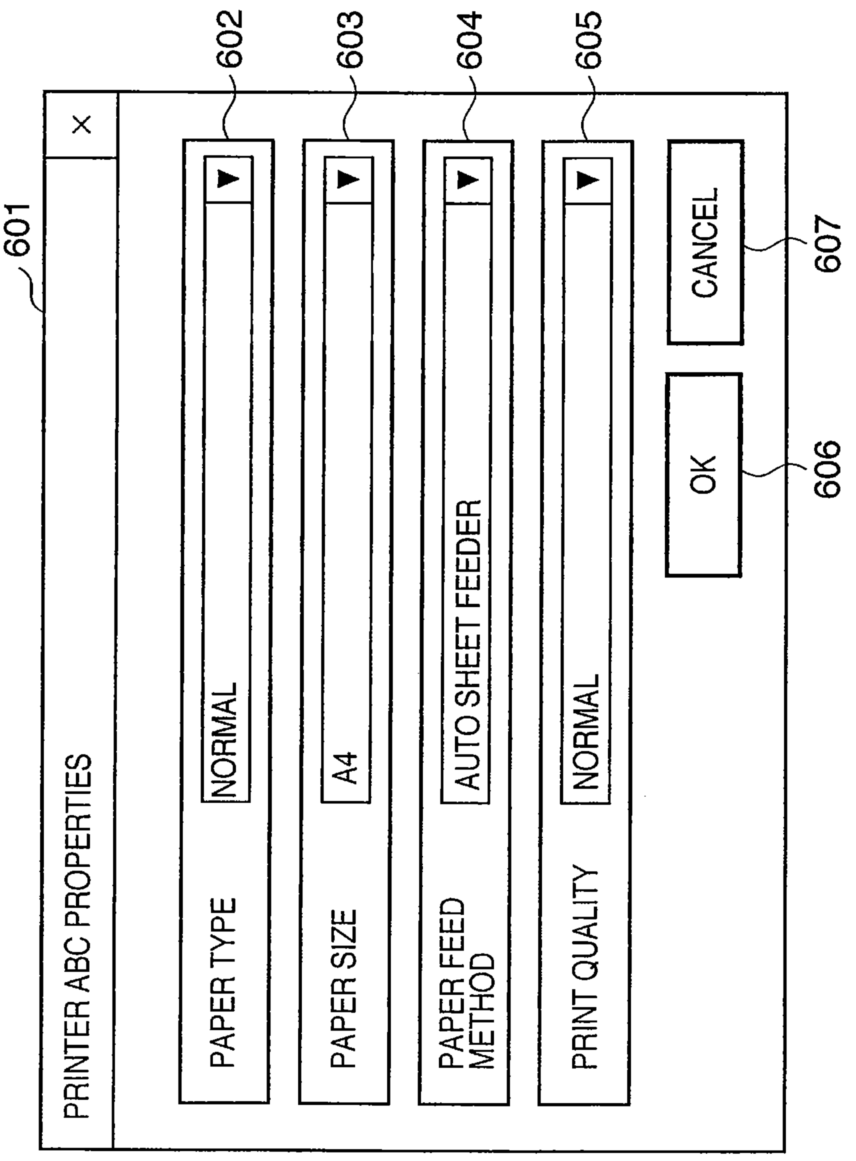
FIG. 6 is a diagram showing an example of a print setting window displayed by a print setting window displaying processing unit of the printer driver shown in FIG. 2.

FIG. 6 is a diagram showing an example of a print setting dialog displayed in the setting information notification unit 113 of the data processing apparatus 102 shown in FIG. 1. FIG. 6 is an example of a print setting dialog displayed at the time of performing a paper feed method, various paper settings, and so on of the present embodiment.

In FIG. 6, a print setting dialog 601 is a print setting window displayed before the user performs print operations through application software or the like, and is displayed by the print setting window displaying processing unit 117. The print setting dialog 601 is a dialog box for the user to perform various settings regarding print data generation, such as the paper type, paper size, paper feed method, print quality, and the like. Note that the print setting dialog 601 is displayed in a display device provided in the setting information notification unit 113 shown in FIG. 1.

As shown in FIG. 6, list boxes 602-605 and buttons 606 and 607 are included in the print setting dialog 601. Each list box is a setting list for displaying current values and candidates for each setting item and for selecting setting values.

A paper type control 602 is a list box for displaying and manipulating the paper type. The paper type currently set and alternate candidates are displayed in the paper type control 602, and the user selects a desired value therefrom. Choices of "normal, coated, glossy, postcard, envelope" and the like are prepared in the paper type control 602, and the selected value is saved as a print setting. Print data corresponding to the type of paper selected here is generated.

The paper size currently set is displayed in a paper size control 603, and the user selects a desired value therefrom. Choices of "B5, A4, Letter, postcard, business card, L, 2L" are prepared in the paper size control 603, and the selected value is saved as a print setting. Print data based on the width and height of the paper corresponding to the paper size selected here is generated. Note that in the case where the printing operation is performed from some application programs, there are cases where the print data is generated based on the paper size set in the application program rather than the paper size set in the paper size control 603. The paper size is determined by the width and height of the paper.

A paper feed method control 604 is a list box for displaying and manipulating the type of paper feed tray in the printer 101 used at the time of printing. Choices of "auto sheet feeder, cassette, follow paper feed tray selection switch of printer" are prepared in the paper feed method control 604. In other words, the paper feed methods that can be set in the present embodiment are "auto sheet feeder", "cassette", or "follow paper feed tray selection switch of printer". The selected value is saved as a print setting. Among these methods, auto sheet feeder and cassette respectively correspond one-to-one to the auto sheet feeder and cassette that are paper feed units provided in the printer 101. In the case where one of these choices is selected and printing operations are performed, paper is supplied from the selected paper feed unit and printing is performed. On the other hand, in the case where "follow paper feed tray selection switch of printer" is selected, in accordance with this setting value, the printer 101 feeds paper from the paper feed tray selected by the paper feed selection unit (auto sheet feeder or cassette) and performs the printing. Note that in the case where the printing operation is performed from some application programs, there are cases where the print data is generated based on the paper feed method saved in the document of the application program rather than the paper feed method set in the paper feed method control 604.

A print quality control 605 can display and select print qualities. Print quality settings differ for each type of paper. The print quality can be selected from among the choices "best, normal, fastest".

When the user clicks an OK button 606, the print settings selected in the print setting dialog 601 are saved, and the print setting dialog 601 closes. When the user clicks a cancel button 607, the print settings selected in the print setting dialog 601 revert to their pre-change states, and the print setting dialog 601 closes.

It should be noted that, while not mentioned here, a configuration in which a refresh button, which refreshes and saves the selection details of the print settings, is added may be used. In this manner, the print setting dialog 601 is configured as a window in which items necessary for the user are collected in a group, and is configured so that the current print settings can be confirmed in an instant.

Figure 7:
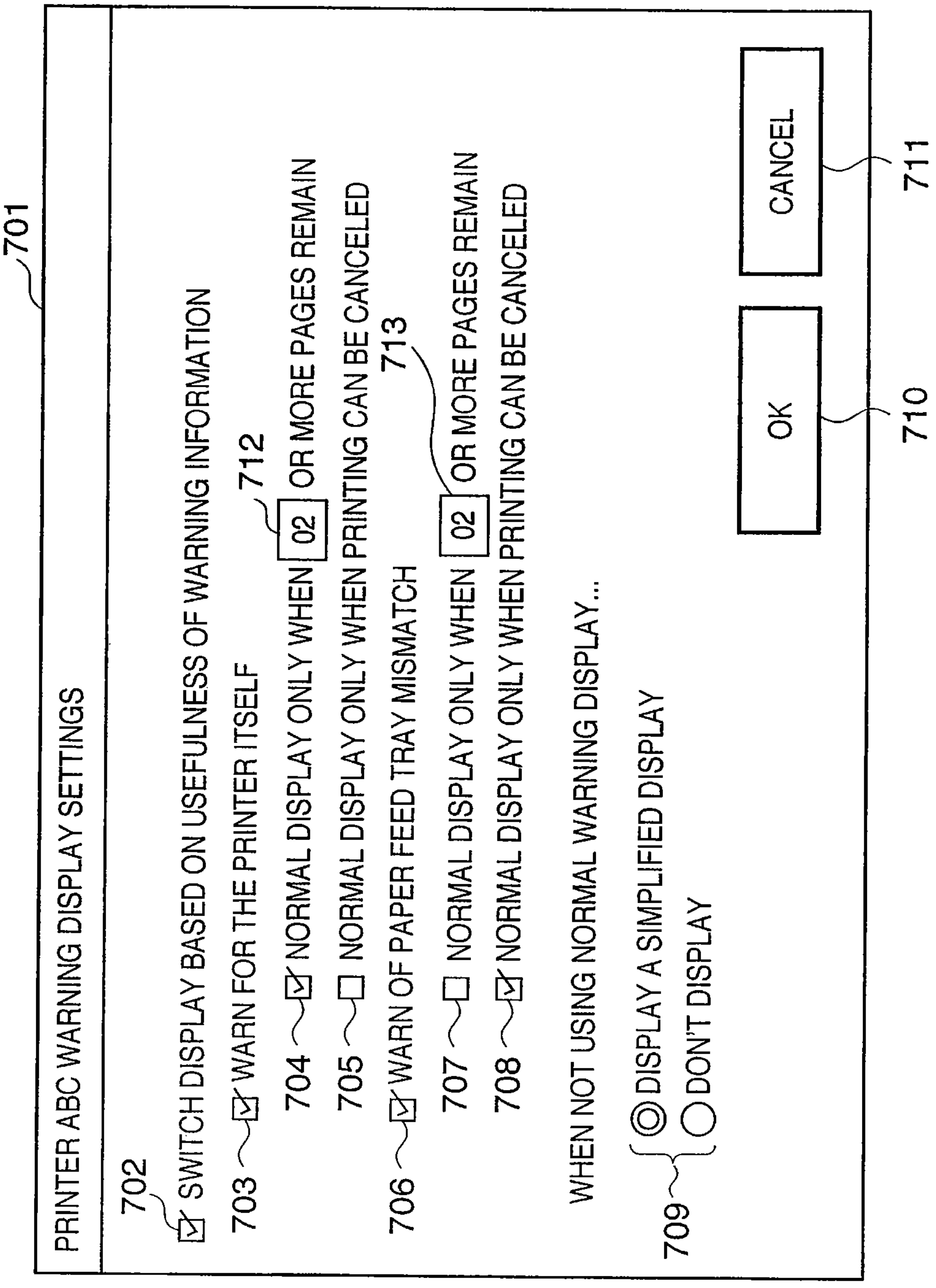
FIG. 7 is a diagram showing an example of a warning display setting window displayed by a status display method setting unit of the printer driver shown in FIG. 2.

FIG. 7 is a diagram showing an example of a warning display setting dialog displayed in the setting information notification unit 113 of the data processing apparatus 102 shown in FIG. 1. Through the warning display setting dialog of FIG. 7 displayed by the status display method setting unit 122, the user can set display conditions and display formats at the time when various types of warning information are displayed in the status display processing unit 120. The setting values (display setting information) are saved in a hard disk or the like.

In FIG. 7, a warning display setting dialog 701 is a dialog box displayed when the user performs operations for setting display conditions and display formats of the warning window. The user can set the following items through this warning display setting dialog 701.

(1) whether or not to switch the display in accordance with the usefulness of the warning information;

(2) for what warning a switch should be made;

(3) what the display conditions of each warning window are; and (4) how to perform display in the case of displaying the warning window differently from normal.

Note that the warning display setting dialog 701 is displayed in a display device provided in the setting information notification unit 113 shown in FIG. 1.

A check box 702 is a check box for setting whether or not to switch the display in accordance with the usefulness of the warning information. In the case where the check box 702 is checked, it is possible to set conditions of the warning display and the display format of the warning information from the printer in accordance with the state of the print job. Warning information of the printer itself and warning information of a paper feed tray display mismatch are included in the warning information. In the case where the check box 702 is not checked, the controls from the check box 703 to the button 710 are in a state in which they cannot be manipulated. Moreover, in the case where a warning display is to be carried out, the warning display is necessarily carried out in the normal display format, or in other words, is displayed in a comparatively large format in the center of the screen so as to be easily recognizable by the user. An example of this display format is given in FIG. 8, which shall be mentioned later.

A check box 703 is a check box for setting whether or not the display should be switched in response to a warning in the printer itself. In the case where this check box is checked, the window display in the case where a warning has occurred in the printer itself is carried out in accordance with the settings of check boxes 704 to 705 and radio button 709, which shall be mentioned later. In the case where the check box 703 is not checked, the check boxes 704 to 705 are in a state in which they cannot be manipulated. Moreover, in the case where a warning has occurred in the printer itself, the warning display is necessarily carried out in the normal display format, or in other words, is displayed in a comparatively large format in the center of the screen so as to be easily recognizable by the user. An example of this display format is given in FIG. 8, which shall be mentioned later.

Figure 9:
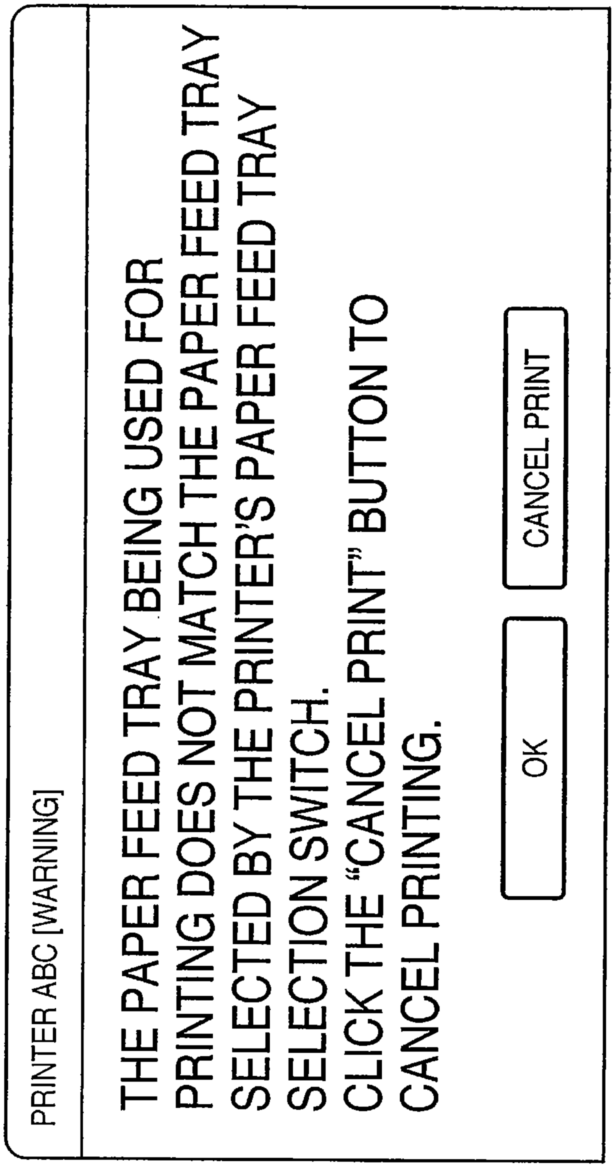
FIG. 9 is a diagram showing an example of a simplified display format of a warning window displayed by a status display processing unit of the printer driver shown in FIG. 2.

A check box 704 is a control for setting whether or not to carry out the warning display as a normal display in the case where a warning has occurred in the printer itself, in accordance with the number of unprinted pages in the print job. When the check box 704 is checked, the normal display is carried out if the number of unprinted pages is greater than or equal to the number of pages set in a text box 712, and a simplified display or no display is carried out if the number of unprinted pages is less than the number of pages set in the text box 712. Here, the unprinted pages can be calculated by finding the difference between the total number of pages in the print job and the page number as illustrated in FIGS. 5A and 5B. Alternatively, as a different configuration, in the case where the difference can be calculated by the printer, the unprinted page number may be replaced with the "page code" in FIGS. 5A and 5B. Only a decimal numeric value, for example, can be input into the text box 712, and the input numeric value is saved as a condition of the aforementioned number of unprinted pages. When the number of unprinted pages is less than the numeric value specified in the text box, the warning window is displayed in a simplified display format such as shown in FIG. 9, or is not displayed at all, in accordance with the setting of the radio button 709. By checking the check box 704, the user can, in the case where the number of unprinted pages of a print job is low, set a warning display that presents no obstruction to continuation of the printing to a simplified format that stands out less than the normal display format, set the warning display to not be displayed, and the like. The case where the number of unprinted pages of a print job is low refers to the case where printing will soon finish. Accordingly, it is possible to appropriately control the warning display without interfering with the display, operations, and the like of other applications.

Figure 8:
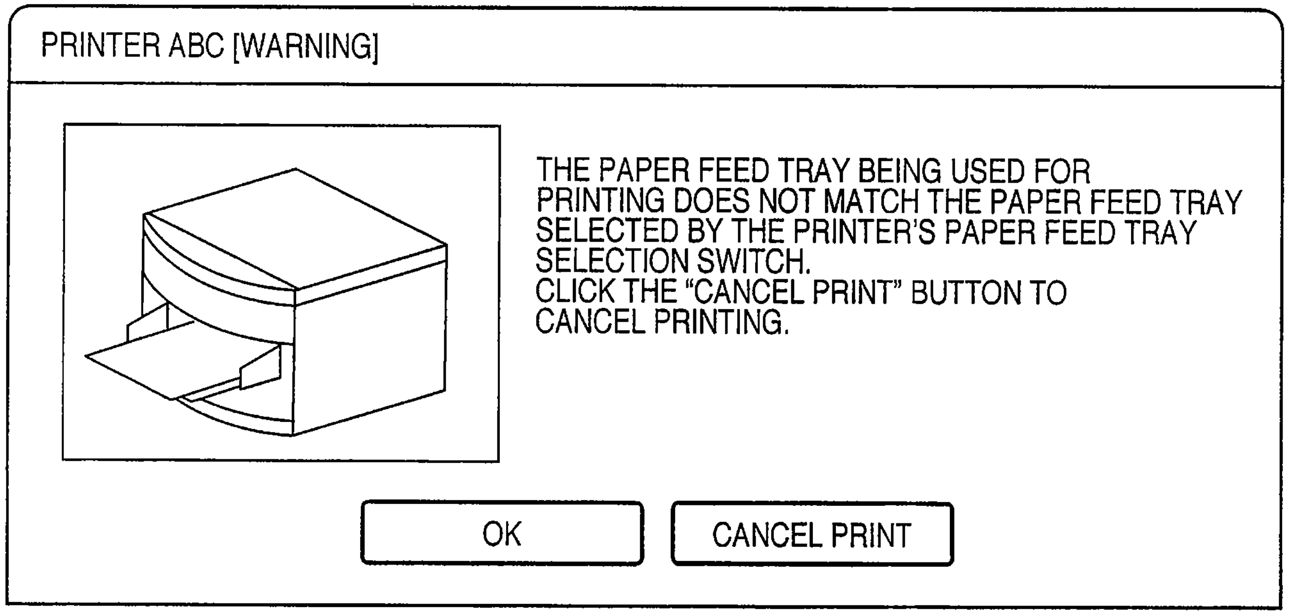
FIG. 8 is a diagram showing an example of a normal display format of a warning window displayed by a status display processing unit of the printer driver shown in FIG. 2.

A check box 705 is a control for setting a warning display of the printer itself in accordance with whether or not the print job is cancelable by the user; in the case where the print job is cancelable by the user, a normal display is carried out, while in the case where the print job is not cancelable by the user, a simplified display or no display is carried out. Note that "cancelable" as used here refers to the capability of stopping or changing the print job. In the case where the check box 705 is checked, when a warning occurs in the printer itself, a warning window is displayed in the normal display format as shown in FIG. 8 if the print job is cancelable by the user. In addition, if the print job is cancelable, an operation is carried out so that the warning window is displayed in a simplified display format such as shown in FIG. 9, or not displayed at all, in accordance with the specification of the radio button 709. For example, whether or not the current print job can be stopped can be determined from among the states of the print job by comparing owner information of the print job with information of the user currently performing operations. By checking the check box 705, the user can, in the case where an operation to cancel the print job cannot be carried out even after the warning status has been acknowledged, set a warning display that presents no obstruction to continuation of the printing to a simplified format that stands out less than the normal display format, set the warning display to not be displayed, and the like. Accordingly, it is possible to appropriately control the warning display without interfering with the display, operations, and the like of other applications.

A check box 706 is a check box for setting whether or not a warning of a mismatch between the paper feed tray selection switch of the printer itself and the paper feed tray specified in the print data is to be included as a reason for switching the display. Note that this warning is simply called a paper feed tray mismatch warning. In the case where the check box 706 is checked, the window display in the case where a paper feed tray mismatch warning has occurred is carried out in accordance with the settings of check boxes 707 to 708 and radio button 709, which shall be mentioned later. In the case where the check box 706 is not checked, the check boxes 707 to 708 are in a state in which they cannot be manipulated. Moreover, in the case where a paper feed tray mismatch warning has occurred, the warning display is necessarily carried out in the normal display format, or in other words, is displayed in a comparatively large format in the center of the screen so as to be easily recognizable by the user. An example of this display format is given in FIG. 8, which shall be mentioned later.

A check box 707 is a control for setting whether or not to carry out the warning display as a normal display in the case where a paper feed tray mismatch warning has occurred, in accordance with the number of unprinted pages in the print job. When the check box 707 is checked, a normal warning display is carried out if the number of unprinted pages is greater than or equal to the number of pages, used as a reference, set in the text box 713, and a simplified display or no display at all is carried out if the number of unprinted pages is less than the number of pages set in the text box 713. Only a decimal numeric value, for example, can be input into the text box 713, and the input numeric value is saved as the number of pages used as a reference. When the number of unprinted pages is less than the reference value specified in the text box 713, the warning window is displayed in a simplified display format such as shown in FIG. 9, or is not displayed at all, in accordance with the setting of the radio button 709. By checking the check box 707, the user can, in the case where the number of unprinted pages of a print job is low, set a paper feed tray mismatch warning display that presents no obstruction to continuation of the printing to a simplified format that stands out less than the normal display format, set the warning display to not be displayed, and the like. The case where the number of unprinted pages of a print job is low refers to the case where printing will soon finish. Accordingly, it is possible to appropriately control the warning display without interfering with the display, operations, and the like of other applications.

A check box 708 is a control for setting a paper feed tray mismatch warning display in accordance with whether or not the user can cancel the print job; in the case where the user can cancel the print job, a normal display is carried out, while in the case where the user cannot cancel the print job, a simplified display or no display is carried out. For example, whether or not the current print job can be stopped can be determined from among the states of the print job by comparing owner information of the print job with information of the user currently performing operations. Note that “cancelable” as used here refers to the capability of stopping or changing the print job. In the case where the check box 708 is checked, when a paper feed tray mismatch warning occurs, a warning window is displayed in the normal display format as shown in FIG. 8 if the print job is cancelable by the user. In addition, if the print job is cancelable, an operation is carried out so that the warning window is displayed in a simplified display format such as shown in FIG. 9, or not displayed at all, in accordance with the specification of the radio button 709. By checking the check box 708, the user can, in the case where an operation to cancel the print job cannot be carried out even after the warning status has been acknowledged, set a paper feed tray mismatch warning display that presents no obstruction to continuation of the printing to a simplified format that stands out less than the normal display format, set the warning display to not be displayed, and the like. Accordingly, it is possible to appropriately control the warning display without interfering with the display, operations, and the like of other applications.

The radio button 709 is a radio button for setting the display format in the case where, as a result of any of the check boxes 704 to 705 and 707 to 708 being checked, the warning display during printing is not to be displayed as a normal display. In the case where “simplified display” is selected in the radio button 709, a display format that is simpler than the normal display format, such as that shown in FIG. 9, is displayed. In the case where “no display” is selected, printing is continued without the warning window being displayed.

When an OK button 710 is clicked, the warning display settings selected in the warning display setting dialog 701 are saved, and the warning display setting dialog 701 closes. The saved warning display settings are saved, for example, as a flag in the case of a check box, a numeric value in the case of the number of remaining pages, and an identifier of the selected item in the case of the radio button. Of course, each setting item is saved so as to be identifiable.

On the other hand, in the case where a cancel button 711 is clicked, the warning display settings selected in the warning display setting dialog 701 revert to their pre-change states, and the warning display setting dialog 701 closes.

It should be noted that, while not mentioned here, a configuration in which a refresh button, which refreshes and saves the selection details of the warning display settings, is added may be used. In this manner, the warning display setting dialog 701 is configured as a window in which items necessary for the user are collected in a group, and is configured so that the current warning display settings can be confirmed in an instant.

FIG. 8 is a diagram showing an example of a normal display format from among warning window display formats. With this display format, the warning information is displayed in the center of the screen; the window is large and easy to view as compared to the simplified display format, which shall be mentioned later. In the case where the warning window is displayed in this display format, the user can quickly recognize that a warning has occurred and respond to the warning (in this display example, click the “cancel print” button and stop the printing, or click the OK button and close the window). However, because this warning window is large and is displayed on top of other application windows, there are cases where this warning window temporarily interferes with the operation of other applications.

FIG. 9 is a diagram showing an example of a simplified display format from among warning window display formats. With this display format, the warning information is displayed in the lower-right of the screen; the window is small as compared to the normal display format. In the case where the warning window is displayed in this display format, it is more difficult for the user to recognize that a warning has occurred than in the case of the normal display format; however, as a small warning window is displayed in the lower-right of the screen, the operation of other applications will rarely be interfered with.

In this manner, it is possible to perform an appropriate warning display in accordance with the state of a print job by switching the warning display between a normal display format and a simplified display format, in accordance with the state of the print job at the time when the warning occurs, and based on the setting details of the warning display setting dialog 701.

<Operation of the Printer Driver>

Figure 10:
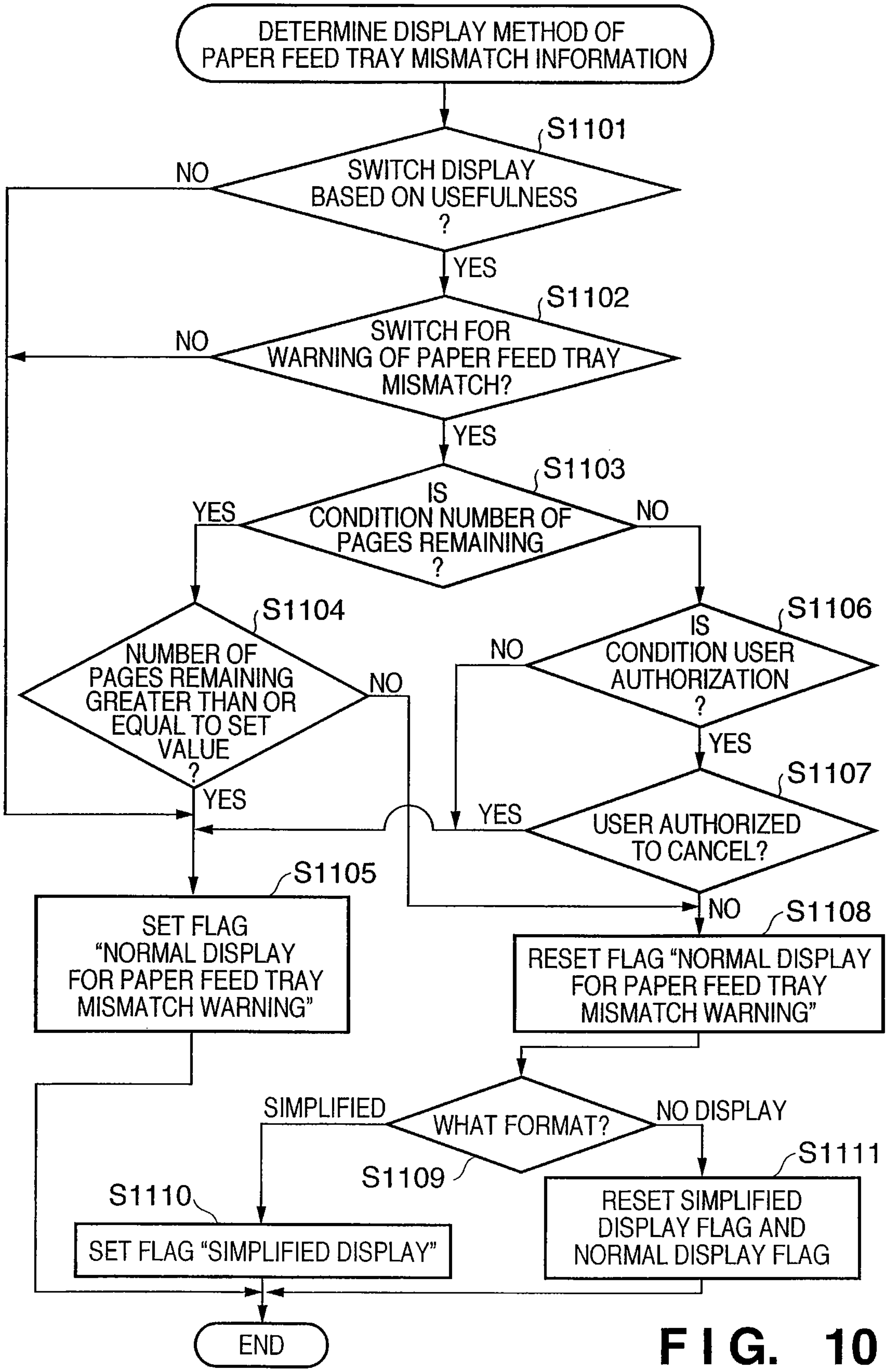
FIG. 10 is a flowchart showing a processing procedure for determining a display format in the status display processing procedure shown in FIG. 4.

Next, a processing operation of the printer driver 114 according to the present embodiment shall be described in detail using the flowcharts of FIGS. 3, 4 and 10.

FIG. 3 is a flowchart illustrating an operation of print data transfer processing performed by the printer driver 114. When printing processing is performed by an application, the print data generation processing unit 116 sequentially generates printer commands from image data information notified by the application and paper type, paper size, paper feed method, and print quality settings specified in the print setting window. The generated printer commands are stored in the print spooler 115 as print data. When the printer commands are stored in the print spooler 115, the monitoring unit 118 is called by the operating system, and processing for transferring the print data to the printer is performed.

In S101 of FIG. 3, the monitoring unit 118 acquires printer commands from the print spooler 115. At this time, the printer commands are acquired in set amounts over a plurality of times, and thus the monitoring unit 118 transfers the acquired printer commands to the printer (S102). The monitoring unit 118 repeats the processing for acquiring a new printer command until transferal of the printer commands for the entire print job has finished (S103). At the same time, the printer commands are sequentially analyzed, and details of the paper feed method settings, which are to be referred to in the status display processing mentioned later, are acquired and saved in a storage area. The procedure proceeds to S104 when the transferal of the printer commands for the entire print job has ended.

In S104, status information received from the printer is referred to, and the progress of the print job is determined based on the page information of the print job. In the case where the transferal of the printer commands has finished and the page information of the printer shows “000”, it is determined that the printing of the print job has finished. In the case where it is determined that the printing of the print job has finished, the processing for transferring the print data ends. In the case where it is determined that the printing of the print job has not finished, the procedure once again returns to the processing in S104, and the processing in S104 and S105 repeats until it is determined that the printing of the print job has finished.

Transferal of the print data to the printer and processing for determining that the print job has finished are carried out in this manner. The monitoring unit 118 does not perform print data transfer processing of a new print job until the printing of the current print job has finished. For this reason, there are no instances of transferal of a subsequent print job commencing even though the printing of the preceding print job has not finished, and therefore there are no instances where the processing that oversees the printing of the print job to the finish cannot be performed properly.

FIG. 4 is a flowchart illustrating a processing operation of the status display processing unit of the printer driver 114. The printer driver performs the print data transfer processing as illustrated in FIG. 3 while simultaneously performing status display processing in parallel. Here, performing the print data transfer processing and status display processing in parallel indicates unsynchronized execution of the processes through multithread processing or multiprocess processing. Accordingly, the PC 102 is configured so as to be capable of receiving status information, including errors and warnings occurring in the printer, from the printer in the format shown in FIGS. 5A and 5B, during the interval from after the print data transfer commences to when printing of the print job finishes. Then, in the case where a warning display has become necessary, error or warning window display is carried out in the display device by the setting information notification unit 113 of the PC 102. In addition, as a different configuration, the processing in FIG. 4 may be started immediately after YES is determined in S103 of FIG. 3, and the processing of FIG. 4 may be ended when the printing has finished in S105.

S201 is a process for acquiring the paper feed method settings specified in the print data in progress. Information expressing other various settings along with the paper supply method settings is embedded within the print data. This information is read out in the abovementioned print data (printer command) acquisition processing (S01), analyzed, and stored in the storage area. Accordingly, the settings for the paper feed method of the print data in the print job set in 604 of FIG. 6 can be acquired by referring to this information in the status display processing.

In S202, it is determined whether or not the printer is in a sleep state. This "sleep state" refers to a state in which power consumption is reduced to a minimum by operating only the minimum functions of the I/F control unit 105 and the print control unit 106, and not operating the printing unit 107, LED and LCD display devices, and the like. In the case where the I/F control unit 105 receives print data (including data of a print request), the printer 101 operates so as to move from the sleep state to a normal operating state. For this reason, power consumption can be reduced in a state where there is no print request, whereas printing operations can be performed normally in a state where there is a print request. In the case where a normally-operating printer does not perform printing for at least a set amount of time, or in the case where a state in which the printer does not receive print data continues, the printer returns to the sleep state. A printer in the sleep state can provide a notification that it is in the sleep state in response to an inquiry from the host device, and can receive print data from the host device, return to the normal state, and perform printing operation. However, the printer cannot notify the host device of various status information.

In the case where it is determined in S202 that the printer is in the sleep state, the status information according to the format shown in FIGS. 5A and 5B cannot be acquired from the printer 101, and therefore the process returns to S201 without proceeding to the processing following S202. While the printer maintains the sleep status, the processing in S201 and S202 are repeated as the status display processing. The PC 102 is controlled by a multitask OS, and thus this loop does not interfere with other processes.

In the case where printing operations are performed, print data is transferred to the printer through the print data transfer processing illustrated in FIG. 3, resulting in the printer returning to the normal state; thus it is determined in S202 that the printer is not in the sleep state. Status information can be acquired from the printer that has returned to the normal state, and therefore the processes from S203 on are performed.

In S203, status information of the printer is acquired. Information of which paper feed tray, the auto sheet feeder or the cassette, is selected by the paper feed tray selection switch of the printer is, as shown in FIGS. 5A and 5B, included in the acquired status information. Various status information including information of a warning occurring in the printer, information of the page being printed, and so on is also included.

In S204, first, determination of a warning status is performed for a status, among the statuses acquired in S203, that is classified as a first type status. A warning determined for the status classified as a first type status is called a first warning status. Specifically, it is determined whether or not a warning status has occurred based on the paper feed method settings specified in the print data acquired in S201 and the paper feed tray selected by the paper feed tray selection switch of the printer as acquired in S203. To be even more specific, it is determined whether the paper feed tray specified in the print data acquired in S201 and the paper feed tray selected by the paper feed tray selection switch of the printer as acquired in S203 match. For example, in the case where the former is the auto sheet feeder and the latter is the cassette, or in the case where the former is the cassette and the latter is the auto sheet feeder, a mismatch is determined and the process proceeds to S210; in the case where the paper feed trays match, the process proceeds to S206.

In S210, the processing state of the print data in the printer (processing status) is determined based on the status information acquired in S203. More specifically, it is determined whether or not the page number information (the page code illustrated in FIGS. 5A and 5B) of the print included in the status information acquired in S203 indicates that the page currently being printed is the first page. In the present embodiment, information indicating a paper feed tray mismatch (mismatch information) is displayed only in the case where the first page is being printed. In S210, in the case where it is determined that the first page is being printed, the process proceeds to S205, and in the case where it is determined that the second page or a subsequent page is being printed, the process proceeds to S206; thereby, mismatch information is displayed only in the case where a paper feed tray mismatch occurs during printing of the first page. As an alternate scheme, the amount of time remaining until printing of the print data in progress finishes may be employed as the processing status of the print data. In this case, the approximate amount of time until printing finishes can be calculated by the host by multiplying the print time for a single page by the number of remaining pages. Whether or not to display a warning is then determined based on the calculated amount of time remaining until printing finishes.

In S205, the warning display method based on a paper feed tray mismatch is determined in accordance with the warning display settings illustrated in FIG. 7 and the state of the current print job. A warning message is displayed in S208, described later, in accordance with the warning display method determined here. In addition, the determined warning display method is saved in a memory, a hard disk, or the like, and is referred to at the time of warning display. Details of S205 shall be explained with reference to FIG. 10.

Next, in S206, determination of a warning status is performed for a status, among the statuses acquired in S203, that is classified as a second type status (different from the first type). A warning determined for the status classified as a second type status is called a second warning status. Specifically, it is determined whether or not the printer is in a warning status based on the status information acquired in S203. As illustrated in FIGS. 5A and 5B, a status "WRN:" indicating a warning status of the printer is included in the status information acquired from the printer 101. In the case where the status information indicates a warning status (the case where a value aside from "NO" is indicated, as in the status information 502 of FIG. 5B), a warning is assumed to have occurred, and the process proceeds to S207. On the other hand, in the case where the "WRN:" status information indicates no warning status (the case where a value of "NO" is indicated, as in the status information 501 of FIG. 5A), a warning is assumed not to have occurred, and the process proceeds to S208. In this case, warning information is not displayed. Note that "IL" (ink low warning), "HH" (rise in head temperature), and the like can be given as examples of warnings to be determined in S206.

In S207, the warning display method based on a warning status of the printer is determined in accordance with the warning display settings illustrated in FIG. 7 and the state of the current print job. A warning message is displayed in S208, described later, in accordance with the warning display format determined here and the warning display method determined above in S205. The determined warning display method is saved in a memory, a hard disk, or the like, and is referred to at the time of warning display. Details of S207 shall be explained with reference to FIG. 10.

Determining the warning display method in accordance with the various display conditions of S205 and S207 is valid particularly in the case where print operations are performed while the printer is in the sleep state. In other words, in the case where print operations are performed while the printer is in the sleep state, the processing from S202 on starts after the printer receives print data and returns to the normal state with the reception acting as a trigger. Therefore, the print processing has already progressed to a certain extent at the time when a paper feed tray mismatch, a warning status, or the like has been noticed. In such a situation, there are many cases where a message display is already invalid, as opposed to the case where print operations are performed while the printer is in the normal state. Cases such as this, in which the message display is invalid, are detected based on display conditions, and the message is not displayed or is carried out with a simplified display, and therefore the display of messages with low usefulness can be reduced to the greatest extent possible.

In S208, a warning display is performed in accordance with the display method determined in S205 and S207. In the case of performing a warning display, a bit map, character string, and the like corresponding to the warning display method are acquired from the message storage unit 123 and displayed. In the present embodiment, the warning display method is indicated by, for example, a flag associated with each respective method. Note that when a paper feed tray mismatch is determined in S204 and it is further determined that the printer is in warning status in S205, in the case where one of the display methods determined in S205 and S208 is the normal display method, the warning display is performed by the normal display method.

In S209, it is determined whether the print job has finished. The determination of whether or not the print job has finished is possible by monitoring the state of the print spooler of the operating system. As explained using FIG. 3, the monitoring unit 118 of the printer driver 114 performs processing for determining whether the printing by the printer has finished per print job (overseeing processing). By not notifying the operating system that a job has finished until the overseeing processing has ended, a state can be maintained in which the print job remains in the print spooler. When the overseeing processing ends and the notification of the job finishing is made, the print job is deleted from the print spooler; therefore, whether or not a job has finished printing can easily be known by monitoring the presence/absence of a print job in the print spooler. In the case where it is determined that the print job has finished, the status display processing ends. In the case where it is determined that the print job has not finished, the status display processing is performed, repeating the processes from S201 on, until the print job finishes.

Note that in the explanation of the flowchart of FIG. 4, a paper feed tray mismatch between the printer and the print data settings is given as the first warning status, while "IL" (ink low warning) is given as a second warning status. However, the present embodiment is not limited thereto. For example, the same effect can also be obtained with a mismatch between the paper size specified in the print data and the paper size set in the paper feed tray being the first warning status and "HH" (rise in head temperature) being the second warning status.

Next, S205 shall be explained with reference to FIG. 10. First, a method for acquiring the various information referred to in this step shall be described.

The warning display settings can be acquired by referring to information saved in the storage area. Also, among the states of the current print job, the number of pages remaining in the print job can be found from the total number of pages in the print job and the status information acquired in S203. In other words, the number of pages remaining can be found by adding 1 to the difference between the total number of pages in the print job and the page information (what number page of the print job is currently being printed) included in the status information. Note that the total number of pages is saved in a memory when the print data is generated. For example, if the total number of pages of the print job is 10 pages, and the third page is currently being printed, it can be seen that the remaining number of pages is 8. In addition, among the states of the current print job, whether or not the current print job can be stopped can be determined by comparing owner information of the print job with information of the user currently performing operations. That is, the print job can be determined to be stoppable if the owner of the print job and the operating user are the same user. Information of the print job owner and information of the operating user can easily be acquired using a function provided by the operating system. It is also possible to add user authorization information to this determination, whereby determination is performed in which a user with a higher level of authorization can terminate the print job of a user with a lower level of authorization.

Explanations shall be given regarding FIG. 10. It should be noted that while the warning display settings are stored in the storage area, the following explanations refer to the various controls shown in FIG. 7.

In FIG. 10, it is determined whether or not the setting for switching the display in accordance with the usefulness (the check box 702) is set (S1101). In the case where the setting is not set, the process proceeds to S1105, and a flag indicating that a paper feed tray mismatch warning is to be displayed by the normal method (a normal display flag) is set.

On the other hand, when the setting is determined as set, it is determined whether the setting in which the display is to be switched for a paper feed tray mismatch (the check box 706) is set (S1102). When this setting is not set, the process proceeds to S1105. When this setting is set, it is determined whether the setting in which the number of pages remaining is a condition for switching the display (the check box 707) is set (S1103).

In the case where this setting is determined as set in S1103, the number of pages remaining in the print job as obtained from the page information included in the status information is compared with the reference value inputted in the text box 712 (S1104). When the number of pages remaining is greater than or equal to the reference value, the process proceeds to S1105. On the other hand, in the case where the number of remaining pages is less than the reference value, the process proceeds to S1108, and the flag indicating that a paper feed tray mismatch warning is to be displayed by the normal method (the normal display flag) is reset. In this case, where the display method is not the normal method, a simplified display or no display is determined in S1109. The basis for the determining is the setting of the radio button 709. In the case of the simplified display, a flag indicating that the paper feed tray mismatch warning is to be carried out with a simplified display (a simplified display flag) is set. On the other hand, in the case where no display is to be carried out, the simplified display flag is reset. In other words, in the case of no display, the normal display flag and the simplified display flag are both reset.

On the other hand, in the case where it is determined in S1103 that the setting in which the number of pages remaining is a condition for switching the display is not set, it is determined whether the setting in which the user authorization is a condition for switching the display (the check box 708) is set. In the case where this setting is set, it is determined whether the current user is authorized to terminate the print job being processed (S1107). Specifically, owner information of the print job is compared with information of the user currently performing operations. When the users match, or in other words, when the current user is authorized to terminate the printing, the process proceeds to S1105, and the warning is displayed through a normal display. However, when the user is not authorized to terminate the printing, the process proceeds to S1108, and the warning is displayed through a simplified display or is not displayed.

The display method of the warning is determined through the above. The processing of S207 is almost identical to FIG. 10, but differs in that the type of warning is not a paper feed tray mismatch, but is a warning occurring in the printer. Accordingly, the check boxes referred to are the check boxes 703-705 rather than the check boxes 706-708. In addition, the text box referred to is the text box 713 rather than the text box 712. Furthermore, the flags that are set or reset in S1105, S1108, S1110, and S1111 are not flags indicating the display method for a warning of a paper feed tray mismatch, but are different flags indicating the display method for a warning of the printer. In other words, it is necessary to replace "paper feed tray mismatch" with "printer" in FIG. 10.

As described thus far, the printing system according to the present embodiment is configured of a printer 101 and a PC 102 connected thereto via an appropriate I/F. The PC 102 detects a warning status occurring in the printer, an incompatibility between a setting of the printer 101 and a setting of the print data, and the like, and displays this as a warning window in accordance with a setting. At this time, in the case where usefulness of a warning display is judged to be low, a simplified warning display or no display at all is carried out, in accordance with the state of the print job and the settings regarding warning displays made by the user. Through this, it is possible to perform a warning display appropriate for the current situation, and to provide a printing system that does not impair the operability of other applications.

It should be noted that although in the present embodiment a paper feed tray mismatch is determined by the PC 102, the paper feed tray mismatch may be determined by the printer 101, and status information indicating the mismatch may be communicated to the PC 102.

[Other Embodiments]

Note that the present invention may be applied in a system configured of a plurality of devices (for example, a host computer, an interface device, a reader, a printer, and so on), or may be applied in an apparatus configured of a single device (for example, a copy machine, a facsimile device, and so on). In addition, the object of the present invention can also be achieved by supplying a system or an apparatus with a storage medium in which program code that realizes the functionality of the aforementioned embodiment is stored, and a computer of the system or apparatus reading out and executing the program code stored in the storage medium. In this case, the program code read out from the storage medium realizes the functionality of the aforementioned embodiment, and the present invention is configured of the program code and the storage medium in which the program code is stored.

In addition, the case where an operating system (OS) running in a computer performs part or all of the actual processing based on the program code, and the functionality of the aforementioned embodiment is realized by that processing, is included in the scope of the present invention. Furthermore, the case where the program code read out from the storage medium is written into a memory provided in a functionality expansion card added to the computer, a functionality expansion unit connected to the computer, or the like is also included within the scope of the present invention. In such a case, a CPU or the like provided in the functionality expansion card or the functionality expansion unit performs part or all of the actual processing based on the program code, and the functionality of the aforementioned embodiment is realized by that processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-188695 filed on Jul. 7, 2006, which is hereby incorporated by reference herein in its entirety.

What is claimed is:

1. A system comprising a printing apparatus and a data processing apparatus, wherein the printing apparatus has a paper feed portion selection switch for designating a paper feed portion from among a plurality of paper feed portions to be used for printing, and wherein the data processing apparatus comprises:

an obtainment unit which obtains status information including information on a paper feed portion designated by the paper feed portion selection switch from the printing apparatus;

a reception unit which receives a selection of a paper feed portion setting of a print job from a setting to follow the designation designated by the paper feed portion selection switch and a setting to output from a specified paper feed portion;

a determination unit which determines whether or not the paper feed portion designated by the paper feed portion selection switch included in the status information correspond to the specified paper feed portion set in the print job if the reception unit receives the setting to output from the specified paper feed portion as the paper feed portion setting of the print job; and a display unit which displays a warning window to cancel the printing processing if the determination unit determines that the paper feed portion designated by the paper feed portion selection switch does not correspond to the specified paper feed portion specified in the print job, wherein the printing apparatus executed the print job using the paper feed portion designated by the paper feed portion selection switch if the setting to follow the designation designated by the paper feed portion selection switch is selected as the paper feed portion setting of the print job.

2. The system according to claim 1, wherein the data processing apparatus further comprising:

a reception unit which receives a designation of a paper feed method as to whether the paper feed portion selected by the paper feed portion selection switch or a specific paper feed portion is used for printing, wherein the display unit displays the warning screen for cancelling the printing processing if it is determined by the determination unit that the paper feed portion designated in the status information is not the same as the specific paper feed portion set in the print job.

3. A data processing apparatus comprising:

an obtainment unit which obtains status information including information on a paper feed portion designated by a paper feed portion selection switch of a printing apparatus from the printing apparatus;

a reception unit which receives a selection of a paper feed portion setting of a print job from a setting to follow the designation designated by the paper feed portion selection switch and a setting to output from a specified paper feed portion;

a determination unit which determines whether or not the paper feed portion designated by the paper feed portion selection switch included in the status information correspond to the specified paper feed portion set in the print job if the reception unit receives the setting to output from the specified paper feed portion as the paper feed portion setting of the print job; and a display unit which displays a warning window to cancel the printing processing if the determination unit determines that the paper feed portion designated by the paper feed portion selection switch does not correspond to the specified paper feed portion specified in the print job, wherein the printing apparatus executed the print job using the paper feed portion designated by the paper feed portion selection switch if the setting to follow the designation designated by the paper feed portion selection switch is selected as the paper feed portion setting of the print job.

4. The data processing apparatus according to claim 3 further comprising:

a second determination unit which determines whether or not a page under the printing processing is the first page, wherein the display unit displays the warning screen if it is determined by the first determination unit that the paper feed portion designated by the printing apparatus in the status information is not the same as the paper feed portion set in the print job and it is determined by the second determination unit that a page under the printing processing is the first page.

5. The data processing apparatus according to claim 3, further comprising:

a third determination unit which determines whether or not the number of remaining pages to be processed by the printing apparatus is a predefined number of pages or more, wherein the display unit switches over the warning screen to/from being displayed from/to not being displayed in accordance with the determination result by the third determination unit.

6. The data processing apparatus according to claim 5, wherein a setting screen is displayed for setting the predefined number of pages.

7. A control method of a data processing apparatus comprising:

an obtainment step of obtaining status information including information on a paper feed portion designated by a paper feed portion selection switch of a printing apparatus from the printing apparatus;

a reception step of receiving a selection of a paper feed portion setting of a print job from a setting to follow the designation designated by the paper feed portion selection switch and a setting to output from a specified paper feed portion;

a determination step of determining whether or not the paper feed portion designated by the paper feed portion selection switch included in the status information correspond to the specified paper feed portion set in the print job if the reception step receives the setting to output from the specified paper feed portion as the paper feed portion setting of the print job; and a display step which displays a warning window to cancel the printing processing if the determination step determines that the paper feed portion designated by the paper feed portion selection switch does not correspond to the specified paper feed portion specified in the print job, wherein the printing apparatus executed the print job using the paper feed portion designated by the paper feed portion selection switch if the setting to follow the designation designated by the paper feed portion selection switch is selected as the paper feed portion setting of the print job.

8. The control method according to claim 7 further comprising:

a second determination step of determining whether or not a page under the printing processing is the first page, wherein the display step displays the warning screen if it is determined in the first determination step that the paper feed portion designated by the printing apparatus in the status information is not the same as the paper feed portion set in the print job and it is determined in the second determination step that a page under the printing processing is the first page.

9. The control method according to claim 7, further comprising:

a third determination step of determining whether or not the number of remaining pages to be processed by the printing apparatus is a predefined number of pages or more, wherein the display unit switches over the warning screen to/from being displayed from/to not being displayed in accordance with the determination result by the third determination step.

10. The control method according to claim 9, wherein a setting screen is displayed for setting the predefined number of pages.

11. A non-transitory computer readable medium in which a program causes a computer to perform a control method of a data processing apparatus comprising:

an obtainment step of obtaining status information including information on a paper feed portion designated by a paper feed portion selection switch of a printing apparatus from the printing apparatus;

a reception step which receives a selection of a paper feed portion setting of a print job from a setting to follow the designation designated by the paper feed portion selection switch and a setting to output from a specified paper feed portion;

a determination step of determining whether or not the paper feed portion designated by the paper feed portion selection switch included in the status information correspond to the specified paper feed portion set in the print job if the reception step receives the setting to output from the specified paper feed portion as the paper feed portion setting of the print job; and a display step which displays a warning window to cancel the printing processing if the determination step determines that the paper feed portion designated by the paper feed portion selection switch does not correspond to the specified paper feed portion specified in the print job, wherein the printing apparatus executed the print job using the paper feed portion designated by the paper feed portion selection switch if the setting to follow the designation designated by the paper feed portion selection switch is selected as the paper feed portion setting of the print job.

12. The non-transitory computer readable medium according to claim 11, the method further comprising:

a second determination step of determining whether or not a page under the printing processing is the first page, wherein the display step displays the warning screen if it is determined in the first determination step that the paper feed portion designated by the printing apparatus in the status information is not the same as the paper feed portion set in the print job and it is determined in the second determination step that a page under the printing processing is the first page.

13. The non-transitory computer readable medium according to claim 11, the method further comprising:

a third determination step of determining whether or not the number of remaining pages to be processed by the printing apparatus is a predefined number of pages or more, wherein the display unit switches over the warning screen to/from being displayed from/to not being displayed in accordance with the determination result by the third determination step.

14. The non-transitory computer readable medium according to claim 13, wherein a setting screen is displayed for setting the predefined number of pages.

* * * * *